United States Patent Office 3,560,851
Patented Feb. 2, 1971

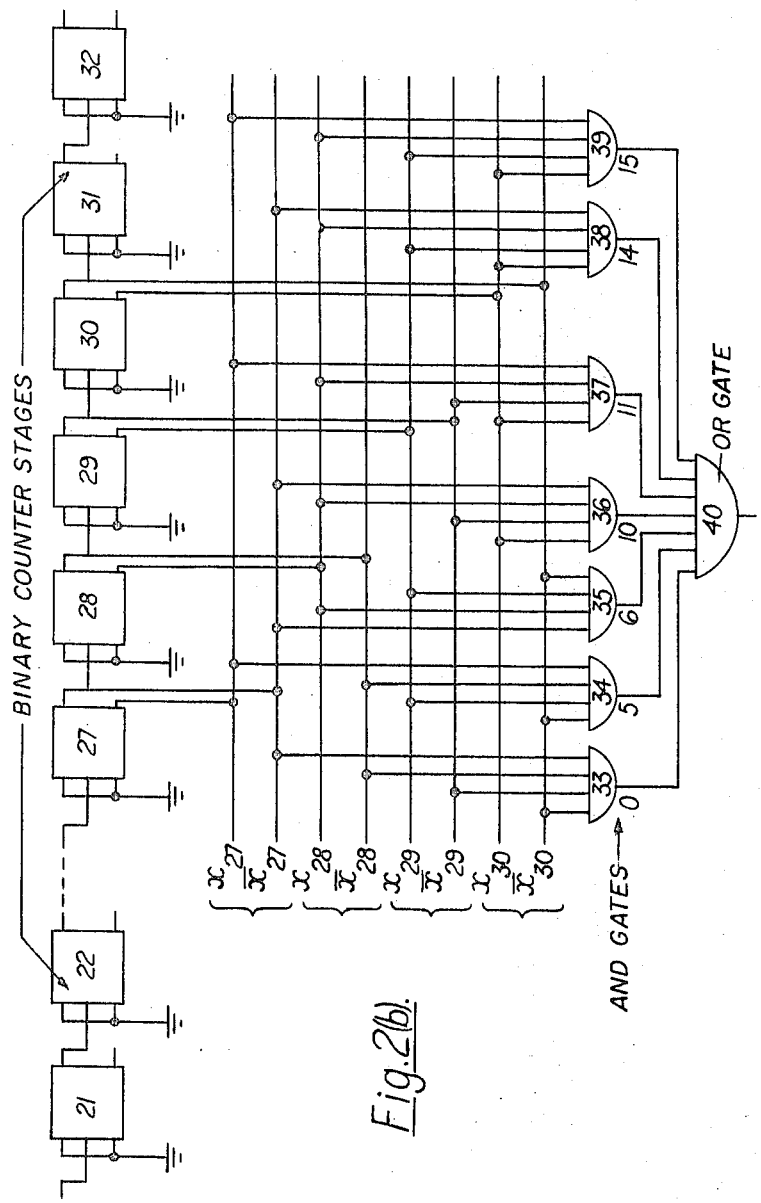

3,560,851
PHASE-SENSITIVE DETECTOR HAVING MEANS FOR SYNTHESIZING A SINE WAVE PLUS HARMONICS
Brian Ronald Gaines, Colchester, and Raymond Allan Shemer, Harlow, England, assignors to International Standard Electric Corporation, New York, N.Y., a corporation of Delaware
Filed Sept. 10, 1968, Ser. No. 758,909
Claims priority, application Great Britain, Sept. 21, 1967, 42,931/67
Int. Cl. G01r 23/16
U.S. Cl. 324—77                                                    5 Claims

ABSTRACT OF THE DISCLOSURE

There is provided a phase-sensitive detector for a simple harmonic waveform including means for synthesizing a sine-wave plus harmonics by generating a pulse train in which the pulses are effectively weighted —E, O+E and in which the pulse clock rate, number of pulses and pulse distribution are so arranged that the amplitudes of selected harmonics in the synthesized sine-wave are minimized, means for multipying the incoming sine-wave with the synthesized sine-wave, means for integrating the resultant and means responsive to the value of the integrated resultant for adjusting the phase of the synthesized sine-wave relative to the phase of the incoming sine-wave.

---

Figure 1:
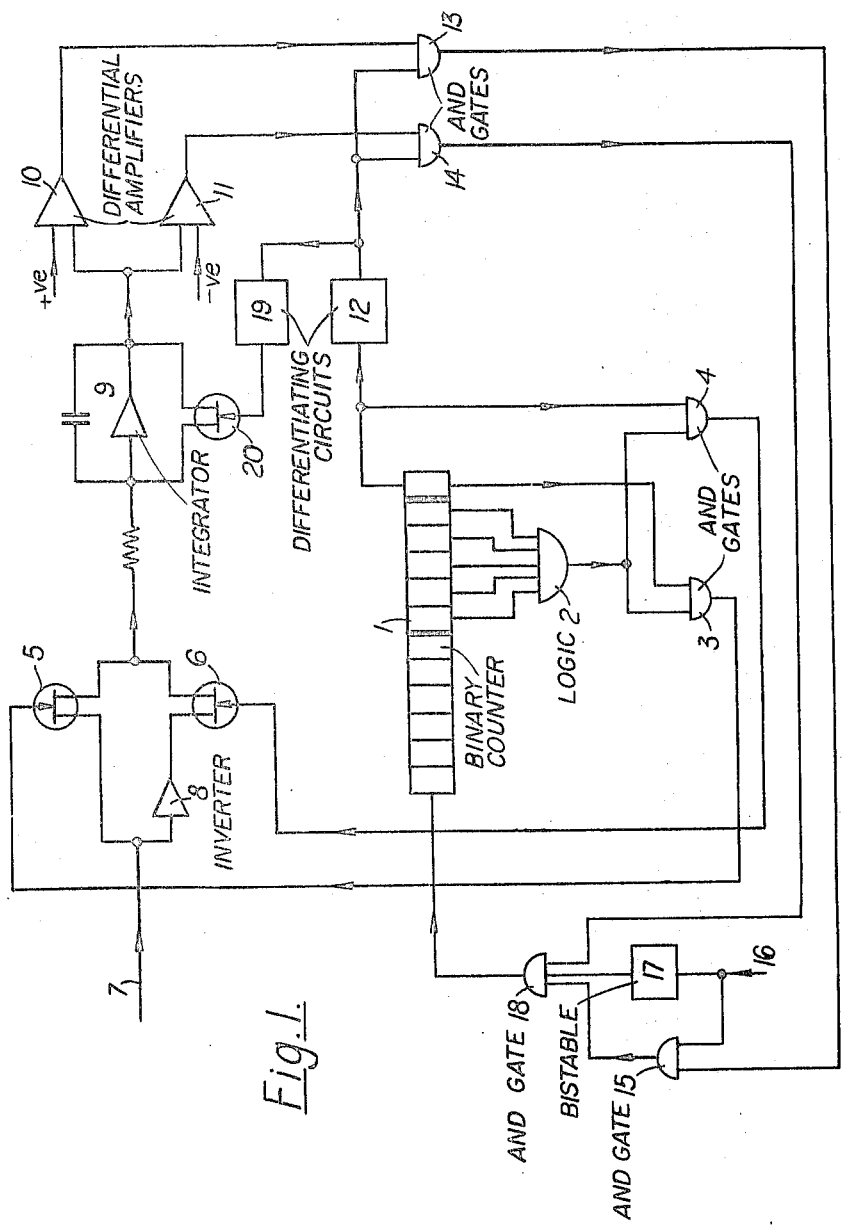

This invention relates to phase-sensitive detectors such as are used in navigational and instrument landing systems (ILS) in aircraft.

The problem of extracting a simple harmonic waveform of known period from a signal containing that waveform, plus random noise and harmonics of that waveform, is a common one in radio and navigation systems. In particular VHF omnirange directional (VOR) beacons depend on the accurate determination of the phase of a 30 Hz. signal relative to that of a 30 Hz. reference signal.

Theoretically the optimum means of extracting such a signal is by cross-correlation with an uncontaminated simple harmonic waveform of the same fundamental frequency. A waveform generator generates both in-phase and quadrature components which are multiplied by the signal, and the results are averaged by low-pass filters to give the two components of the signal at the generator frequency.

The longer the time constant of the averaging filters the better the discrimination between the effects of the signal and the effects of its harmonics plus noise. Hence the amplitude and phase of the signal at the given frequency may be determined to any desired accuracy no matter what the degree of contamination by suitably long average filters. The system includes a feedback arrangement to enable the phase of the generator to be altered thereby enabling the latter to be locked into phase with the incoming signal. It will be apparent however that the greater the attenuation in the feedback loop the longer it will take for the generator to be locked to the phase of the incoming signal. However, the greater the attenuation in the loop the smaller the error due to harmonics and noise.

One method of overcoming the disadvantages of using a simple-harmonic waveform as the locally generated reference signal is to use instead a square-wave of the same frequency. Multiplication of the local and incoming signals is then performed by relay switching. However, it may be shown that a square wave can be regarded as a simple harmonic fundamental plus one third third-harmonic plus one fifth fifth-harmonic etc. If the incoming signal includes similar components then these, depending on their phase, may give rise to bias in the in-phase and quadrature outputs since these no longer represent the effects of the fundamental alone. Filtering out the third harmonic with a pre-filter in the incoming signal introduces phase shift in the fundamental. In addition the filter is expensive since it must be made from stable components if this shift is not to change.

According to this invention there is provided a phase sensitive detector for a simple harmonic waveform including means for synthesizing a sine-wave plus harmonics by generating a pulse train in which the pulses are effectively weighted —E, O+E and in which the pulse clock rate, number of pulses and pulse distribution are so arranged that the amplitudes of selected harmonics in the synthesized sine-wave are minimized, means for multiplying the incoming sine-wave with the synthesized sine-wave, means for integrating the resultant and means responsive to the value of the integrated resultant for adjusting the phase of the synthesized sine-wave relative to the phase of the incoming sine-wave.

In a preferred embodiment of the invention the means for synthesizing the sine-wave comprises a binary counter, logic gating means for deriving from the binary counter pulses at selected stages of the count in the counter and clock pulse driving means for cycling the counter.

In one embodiment the invention includes means responsive to the polarity of the integrated resultant to modify the clock pulse input to the counter by addition or inhibition of pulses to adjust the phase of the synthesized wave relative to the phase of the incoming sine wave.

The above mentioned and other feautres of the invention and the manner of attaining them will become more apparent and the invention itself will be best understood by reference to the following description of an embodiment of the invention taken in conjunction with the accompanying drawings, wherein:

FIG. 1 illustrates diagrammatically an arrangement for detecting the phase of a sine-wave signal, and FIGS. 2a and 2b illustrate diagrammatically the use of a binary counter and logic to generate a pulse train synthesis of a sine wave.

In the arrangement shown in FIG. 1 a binary counter 1 is used to generate, via logic 2, a pulse train synthesizing a simple harmonic waveform, with particular harmonics minimized. In practice, as will be shown later, a particular pulse sequence is derived which synthesizes only one half of the sine-wave cycle, and this sequence is effectively reversed or inverted to synthesize the second half of the sine wave cycle. Therefore the pulse sequence is derived from the counter stages preceding the last stage, the last stage being used to control further AND gating 3, 4 which directs the pulse sequence alternately to two field effect transistors 5, 6 where the synthesized sine wave is effectively multiplied with the incoming sine wave 7. At transistor 5 the pulse train modulates the normal sine wave 7 and at transistor 6 it modulates the sine wave inverted by the inverter 8. The combined modulated outputs of transistors 5 and 6 are integrated by the integrating circuit 9 and the integrated signal is compared with positive and negative reference signals respectively by two differential amplifiers 10, 11. The outputs of the differential amplifiers provide the feedback phase control used to bring the counter 1 into phase with the incoming sine wave 7.

The last stage of the counter 1, in addition to controlling the transistors 5, 6 also provides a timing or strobe signal to the feedback loop via differentiating circuit 12. The function of the feedback loop is to adjust the phase of the synthesized sine wave by incrementing or inhibiting the driving clock pulse train.

The output of the integrating circuit is either positive or negative, depending on whether the counter leads or lags the input 7. It the counter is lagging the input, a negative output is derived from the integrating circuit 9 and this, if it exceeds the negative reference input to the amplifier, produces an output which goes to AND gate 13. This gate is opened once each cycle by the timing pulse from 12, and allows the output from 10 to go through to another AND gate 15. The binary counter 1 is driven by a clock pulse train at a frequency $f/2$. This is derived from a clock pulse source which actually generates a pulse train 16 of frequency $f$. The pulse train 16 is applied to a bistable 17 one output of which provides the frequency $f/2$. Pulse train 16 also goes to gate 15, and if the other input from gate 13 is present, a pulse from the train 16 is allowed through gate 15 to the gate 18. The output from bistable 17 is arranged so that any pulse from gate 15 in interleaved between two pulses from 17, this inserting an extra pulse into the driving pulse train for counter 1. Thus the phase of counter 1 is advanced, incrementally, until it is in phase with the input 7.

Conversely, if the counter 1 leads the input 7, the output of amplifiers 11 is allowed, via gate 14, to inhibit one pulse of the driving train during each cycle of the counter.

Finally, after each cycle has been completed the integrating circuit is discharged and reset. This is achieved by including a second differentiating circuit 19, to which the output of the first differentiating circuit 12 is applied, and using the output of 19 to operate a field effect transistor 20 to discharge circuit 9. Differentiator 19 provides a suitable delay for the reset pulse allowing the feedback loop to complete its operation before circuit 9 is discharged.

The choice of a particular pulse train sequence to synthesize a sine-wave will be dictated by the requirements of the system. For example, even harmonics can be ignored, whilst in some cases only the lower odd harmonics have any effect on the system. Thus minimizing of the third harmonic may be the most important requirement. Reduction of the fifth harmonic is important, but not as important as that of the third. The representation or synthesis of the waveform is in amplitude by the proportion of ON logic levels in a clocked sequence of ON and OFF logic levels, and in sign by which of two lines on which the ON levels occur. For example, the sequence 0001000100010001 etc., would represent an average amplitude of 0.25. A sequence 0101010101 etc. represents an average amplitude of 0.5 and a sequence

0101110101011101011101 etc. represents an average amplitude of 0.625.

A sine wave, in the first two quadrants, is represented basically by a sequence of logic levels with a continually increasing proportion of ON logic levels until, at the end of the first quadrant the sequence is wholly ON, and then a continually decreasing proportion of ON levels until, at the end of the second quadrant the sequence is wholly OFF. The sequence in the second quadrant is in fact a mirror image of that in the first, and both sequences appear at gate 3. The third and fourth quadrants are a repeat of the first and second quadrants except that the sequences now appear at gate 4, thus being effectively inverted. However, basic sequences such as these not only incorporate the fundamental sine wave frequency but also harmonics. To reduce the odd harmonics in a sequence, it is necessary to redistribute the pulses in a sequence, without changing the overall proportion. For example, the sequence shown in FIG. 2($a$), i.e. 1000011000110011 represents the first quadrant of a sine wave containing only 0.0001% third harmonic. In fact the fifth harmonic content of such a waveform will be fairly high, say 16%. A different sequence can be devised to contain acceptably low percentage of both third and fifth harmonics.

The generation of the sequence shown in FIG. 2($a$) is accomplished by using the 7th–10th stages of the counter 1 in FIG. 1 as shown in FIG. 2($b$). The 11th and 12th stages are used to effect what may be described as control of the quadrant and sign of the sequence, since the same sequences are used four times for each sine wave. The function of the first 6 stages of the binary counter will be explained later.

The four stages of the binary counter, i.e., 7th–10th stages, will count to a total of 16, equal to the total number of bit positions in the pulse sequence of FIG. 2($a$). However a pulse output is only required in a selected 7 bit positions in the sequence. Therefore each of the four stages 27–30 of the counter in FIG. 2($b$) has two outputs, $x_{27}$ and $\bar{x}_{27}$, etc. respectively. A set of 7 logic AND gates 31–39 is provided, one for each pulse required in the sequence. Each of those gates has four inputs which are derived one from each counter stage, either $x$ or $\bar{x}$. The outputs of gates 33–39 are all fed to a 7-input OR gate 40 the output of which is the required pulse sequence. In practice this sequence would have to be reversed for the second quadrant. To reverse the counter is not practical so stage 31 can instead be added to generate a 32-digit sequence for the first two quadrants. This necessitates a further set of 7 AND gates in the logic, and both the original and the additional sets of gates will now be 5-input gates.

The function of stage 32 of the counter has already been explained in connection with FIG. 1.

It has already been explained how the phase-locking feedback loop operates. However, if the feedback loop is arranged to insert or inhibit one driving pulse at the first stage of the counter used to generate the pulse sequence, i.e. stage 27, it would provide a fairly crude adjustment of the phase. This is because the synthesis of one complete sine wave cycle uses a total pulse sequence of 64 bits. Adjustment of the clock pulses at stage 27 would therefore mean that the finest grade of adjustment possible is 1/64 of one cycle. This does have one advantage however, in that for a sine-wave frequency of 30 Hz. phase locking must be achieved within a maximum time of approximately 1 second. Nevertheless, the accuracy obtainable is not sufficient, and so additional stages 21–26 are added to the front of the counter and the clock frequency is altered accordingly. With 6 extra stages the effect of one single clock pulse extra or less is now equal to a phase adjustment of 1/4096 of one cycle. On the other hand, the maximum time required to reach phase locking is greatly increased, i.e., it will be 64 seconds, approximately. If this is unacceptable it is possible to introduce a third feedback signal additional to those obtained from amplifiers 10, 11 by which an additional pulse is inserted in stage 26 or 27 if the phase difference exceeds 1/128 or 1/64 of one cycle. Thus an initial course adjustment is followed by a very fine adjustment, phase locking being achieved with a reasonably short time.

An alternative arrangement is to omit the extra course feedback loop and to use instead the incoming signal to start the clock pulse drive to the counter. If the incoming signal is squared and differentiated it can be used to trigger the clock pulse source 16 and the counter can then be started from rest and instantly be within a very few degrees of the phase-locked condition. The final fine adjustment is then provided by the feedback loop of FIG. 1. This has the advantage that an aerial navigation when a plane flies directly over a beacon a minimum period of confusion occurs.

FIG. 1 shows an arrangement in which the phaselocking feedback loop operates on a single cycle basis, the integrating circuit 9 being discharged and reset at the completion of each cycle of the counter 1. This is acceptable when the incoming signal 7 does not contain a large amount of noise. However, if the input 7 is very noisy it is advisable to allow the integration circuit more than one cycle to counteract the noise. One method of doing this is to provide the capacitor of circuit 9 with a leakage or slow discharge path and to arrange for reset to occur after a suitable interval. This will mean modification of the reset circuit, for example by introducing frequency dividing logic into the reset circuit after differentiator 19.

It is to be understood that the foregoing description of specific examples of this invention is made by way of example only and is not to be considered as a limitation on its scope.

We claim:

1. A phase sensitive detector for a simple harmonic waveform including:

means for synthesizing a sine-wave plus harmonics comprising a binary counter, logic gating means for deriving from the binary counter pulses at selected stages of the count in the counter, and clock pulse driving means for cycling the counter, said means generating a pulse train in which the amplitudes of selected harmonics in the synthesized sine-wave are minimized;

means for multiplying an incoming sine-wave with the synthesized sine-wave;

means for integrating a resultant signal; and means responsive to the value of the integrated resultant signal for adjusting the phase of the synthesized sine-wave relative to the phase of the incoming sine-wave.

2. A detector according to claim 1 in which the counter generates a pulse train synthesis of one half-cycle only of the sine-wave; and the detector further including inverting means in said means for multiplying, whereby the pulse train is alternately multiplied with positive and inverted negative half cycles of the incoming sine-wave.

3. A detector according to claim 2 in which the means for adjusting the phase of the synthesized wave comprises means responsive to the polarity of the integrated reultant to modify the clock pulse input to the counter by addition or inhibition of pulses to adjust the phase of the synthesized wave relative to the phase of the incoming sine-wave.

4. A detector according to claim 3 in which the binary counter includes additional counting stages preceding those used for generating the synthesized sine-wave.

5. A detector according to claim 1 including means for discharging and resetting the integrating means at regular intervals.

References Cited

UNITED STATES PATENTS 3,328,686   6/1967   Fuchs _____ 324—77

EDWARD E. KUBASIEWICZ, Primary Examiner

U.S. Cl. X.R.

324—83